M. HAUPT.
VEHICLE LEVELER.
APPLICATION FILED JUNE 18, 1917.
1,257,704.
Patented Feb. 26, 1918.
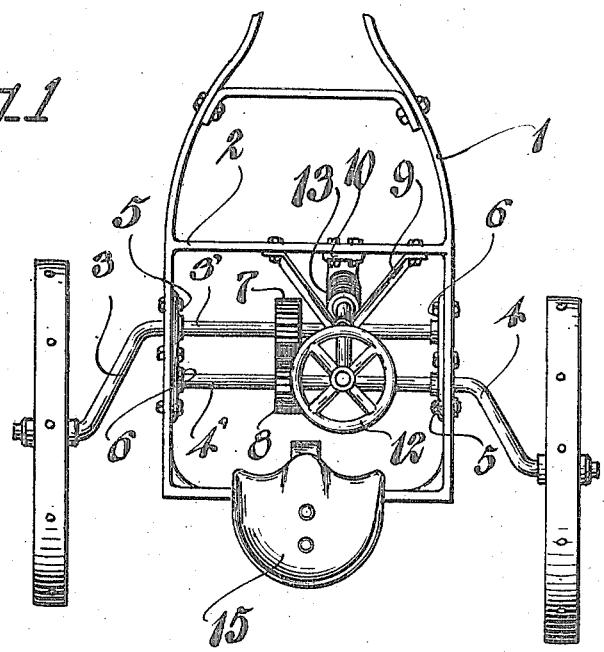
Fig. 1
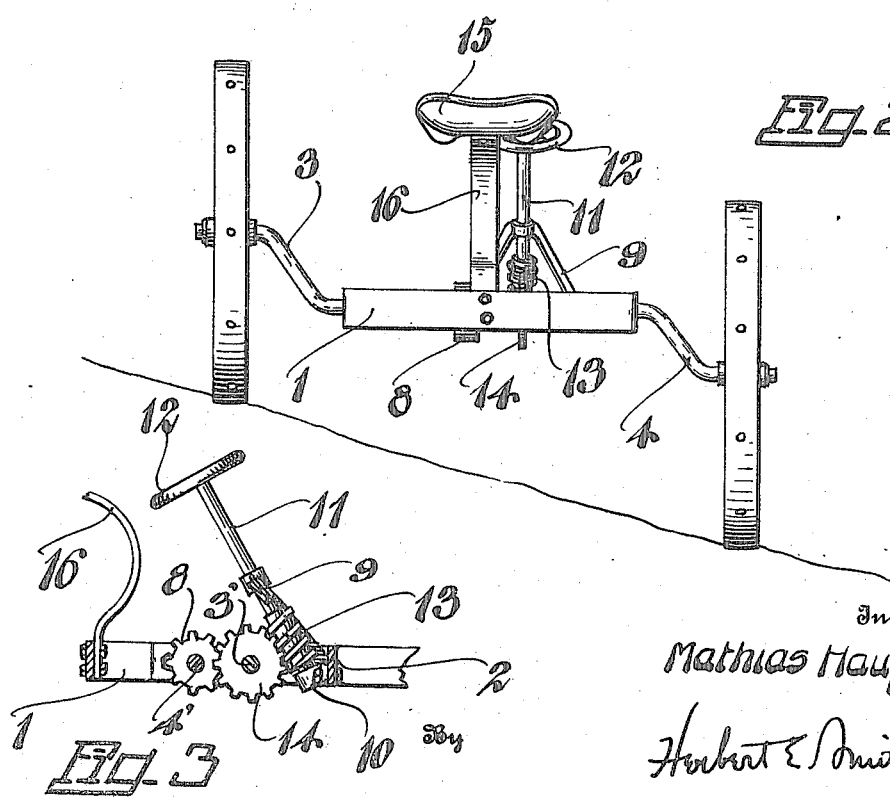
Fig. 2
Fig. 3
Inventor
Mathias Haupt
By Herbert E. Smith
Attorney

UNITED STATES PATENT OFFICE.

MATHIAS HAUPT, OF SPOKANE, WASHINGTON.

VEHICLE-LEVELER.

1,257,704.        Specification of Letters Patent.     Patented Feb. 26, 1918.

Application filed June 18, 1917. Serial No. 175,511.

*To all whom it may concern:*

Be it known that I, MATHIAS HAUPT, a citizen of the United States, residing at Spokane, in the county of Spokane and State of Washington, have invented certain new and useful Improvements in Vehicle-Levelers, of which the following is a specification.

My invention relates to improvements in vehicle levelers.

One object thereof is the provision of conveniently arranged, effective, and novel adjusting mechanism operable from the driver's seat, whereby the frame of the vehicle, which is intended for the support of plows, seeders, harrows and other farm cultivators of like character, may be maintained in a substantially level position when in use on hilly, sloping ground.

An additional object is the provision of a construction, mechanism, and parts of extreme simplicity, which may be manufactured very cheaply, and which will be very rigid, strong, and durable.

The invention resides in the novel combination, arrangement, and details of construction which will be hereinafter fully pointed out and described in connection with the accompanying drawings, in which—

Figure 1 is a top plan view of a vehicle embodying my invention, the crank axles being in the positions they assume when adjusted to level the vehicle frame on sloping ground.

Fig. 2 is a rear elevation of the vehicle shown in Fig. 1 and illustrating the adaptability of the leveler on sloping ground.

Fig. 3 is a fragmental, part sectional view in side elevation, showing the arrangement of the worm-gear adjusting mechanism.

Referring more specifically to the drawings, in which like characters of reference are used to indicate like parts in the several views, the numeral 1 designates a vehicle frame, preferably of metal construction, and having a transverse cross-bar 2. A pair of crank-axles 3 and 4 have integral shaft portions 3' and 4', respectively, which extend in spaced parallel relation transversely of the frame, each axle being revolubly mounted in a bearing 5 secured to one of the frame sides, the axle extending through a bearing aperture in said side, and having its inner end revolubly mounted in a stub-bearing 6 upon the opposite side of the frame. The traction wheels of the vehicle are mounted upon the outwardly extended ends of said crank-axles. The axles are provided with and geared together by fixedly mounted, intermeshing, toothed gears 7 and 8.

A bracket 9 and a bearing 10, both secured to the cross-bar 2, rotatably support a slanting operating shaft 11 having a hand wheel 12 and a worm-gear 13 which worm gear meshes with and is adapted to rotate a toothed gear wheel 14 fixedly mounted on the forward crank axle 3. The hand wheel 12 is disposed so as to be convenient for operation from the driver's seat 15 which latter is supported by a curved spring 16 extending upwardly from the vehicle frame.

In actual use of the leveling mechanism, it is obvious that turning of the hand wheel in one direction of rotation will serve to elevate one of the vehicle wheels relative to the frame and at the same time to correspondingly depress the opposite vehicle wheel. The effect is, of course, reversed by turning the hand wheel in the opposite direction. It is to be especially noted that by reason of the simultaneous raising and lowering of the opposed vehicle wheels the desired leveling of the frame when sloping ground is encountered may be very quickly effected. This feature is therefore a decidedly more advantageous arrangement than separately operated crank axles. The worm gear action is positive, convenient to operate, and eliminates the necessity for a device to lock the axles in adjusted position, such as would be required were a lever action employed to effect the turning of the axles.

Applicant is aware that crank axles have been used for the same purpose as the present device and he therefore disclaims as his invention the broad principle of operation involved; but he does not believe that anyone has heretofore provided a leveler embodying the several features of construction herein set forth.

Having described my improvements, I claim:—

1. In a vehicle leveler, a vehicle frame, a pair of crank axles each revolubly mounted and supported in bearings carried by the opposite sides of said frame, integral shaft portions of the axle disposed in spaced, parallel relation, toothed intermeshing gears fixedly mounted on said integral shaft portions of the axles, an additional toothed gear fixedly mounted on one of said shaft portions, and a worm gear meshing with said additional gear.

2. In a vehicle leveler, a vehicle frame, a pair of crank axles each revolubly mounted and supported in bearings carried by the opposite sides of said frame, integral shaft portions of the axles disposed in spaced, parallel relation, toothed, intermeshing gears fixedly mounted on said integral shaft portions of the axles, an additional toothed gear fixedly mounted on one of said shaft portions, a transverse cross-bar extending between the sides of the vehicle frame, a bracket and a bearing secured thereto, a shaft revolubly supported by said bracket and bearing, and a worm gear on said shaft meshing with said additional gear.

In testimony whereof I affix my signature.

MATHIAS HAUPT.

Copies of this patent may be obtained for five cents each, by addressing the "Commissioner of Patents, Washington, D. C."